US011768929B2

(12) United States Patent
Gledhill, III et al.

(10) Patent No.: US 11,768,929 B2
(45) Date of Patent: Sep. 26, 2023

(54) LOCKOUT SYSTEM FOR METERING PUMP

(71) Applicant: BLUE-WHITE INDUSTRIES, LTD., Huntington Beach, CA (US)

(72) Inventors: Robert E. Gledhill, III, Huntington Beach, CA (US); John T. Nguyen, Fountain Valley, CA (US)

(73) Assignee: Blue-White Industries, Ltd., Huntington Beach, CA (US)

( * ) Notice: Subject to any disclaimer, the term of this patent is extended or adjusted under 35 U.S.C. 154(b) by 253 days.

(21) Appl. No.: 17/006,489

(22) Filed: Aug. 28, 2020

(65) Prior Publication Data
US 2021/0064735 A1 Mar. 4, 2021

Related U.S. Application Data

(60) Provisional application No. 62/895,934, filed on Sep. 4, 2019.

(51) Int. Cl.
G06F 21/44 (2013.01)
F04B 49/10 (2006.01)
F04B 13/00 (2006.01)

(52) U.S. Cl.
CPC .............. G06F 21/44 (2013.01); F04B 13/00 (2013.01); F04B 49/10 (2013.01)

(58) Field of Classification Search
CPC ............. G06F 21/44; G06F 2221/2149; G06F 21/6218; F04B 13/00; F04B 49/10; F04B 17/03; F04B 49/06; F04B 49/103; F04B 49/20; F04B 49/065; F04B 2207/70

USPC ........................................................ 340/5.54
See application file for complete search history.

(56) References Cited

U.S. PATENT DOCUMENTS

| 4,843,385 | A | * | 6/1989 | Borras | H04M 1/724 340/5.74 |
| 5,015,151 | A | * | 5/1991 | Snyder, Jr. | F04D 15/0254 417/18 |
| 5,791,880 | A | | 8/1998 | Wilson | |
| 7,001,153 | B2 | | 2/2006 | McDowell et al. | |
| 7,284,964 | B2 | | 10/2007 | McDowell et al. | |
| 7,988,425 | B1 | | 8/2011 | Stingl | |
| 8,215,931 | B2 | | 7/2012 | McDowell et al. | |
| 8,418,364 | B2 | | 4/2013 | McDowell et al. | |
| 8,639,363 | B2 | | 1/2014 | Gledhill, III et al. | |
| 9,374,024 | B2 | | 6/2016 | Nguyen et al. | |
| 9,389,109 | B2 | | 7/2016 | Gledhill, III et al. | |

(Continued)

FOREIGN PATENT DOCUMENTS

| JP | 2017-137799 A | 8/2017 |
| JP | 2018-62884 | 4/2018 |
| WO | WO 99/22138 | 5/1999 |

Primary Examiner — Ojiako K Nwugo
(74) Attorney, Agent, or Firm — Knobbe, Martens, Olson & Bear, LLP

(57) ABSTRACT

A lockout system for a metering pump is provided. The lockout system can include a user interface that is used to switch the pump between a locked configuration and an unlocked configuration. In the locked configuration, the operation of the pump cannot be adjusted through the user interface. In the unlocked configuration, the operation of the pump can be adjusted through the user interface. The lockout system can include a passkey notice that provides information regarding how to use the user interface to switch the pump between the locked and unlocked configurations.

16 Claims, 3 Drawing Sheets

(56) References Cited

U.S. PATENT DOCUMENTS

| | | |
|---|---|---|
| 9,777,720 B2 | 10/2017 | Gledhill, III et al. |
| 9,828,984 B2 | 11/2017 | Gledhill, III et al. |
| 9,909,579 B2 | 3/2018 | Gledhill, III et al. |
| 9,996,089 B2 | 6/2018 | Gledhill, III et al. |
| 10,330,094 B2 | 6/2019 | Gledhill, III et al. |
| 10,906,624 B1* | 2/2021 | MacPherson .............. E03F 5/22 |
| 10,948,320 B2 | 3/2021 | Gledhill, III et al. |
| 11,131,300 B2 | 9/2021 | Gledhill, III et al. |
| 11,150,118 B2 | 10/2021 | Gledhill, III et al. |
| 11,221,004 B2 | 1/2022 | Gledhill, III et al. |
| 11,261,857 B2 | 3/2022 | Gledhill, III et al. |
| D959,238 S | 8/2022 | Nguyen et al. |
| 11,402,248 B2 | 8/2022 | Gledhill, III et al. |
| 11,485,653 B2 | 11/2022 | Gledhill, III et al. |
| 11,578,716 B2 | 2/2023 | Gledhill, III et al. |
| 2002/0185423 A1* | 12/2002 | Boyd ..................... C01B 13/10 |
| | | 210/167.3 |
| 2007/0041844 A1* | 2/2007 | Nallenweg .............. F04B 49/00 |
| | | 417/63 |
| 2007/0088269 A1* | 4/2007 | Valego .................. A61M 5/142 |
| | | 604/151 |
| 2007/0154323 A1* | 7/2007 | Stiles, Jr. ............. F04D 15/0077 |
| | | 417/44.1 |
| 2009/0005729 A1* | 1/2009 | Hendrixson ....... G05B 19/0428 |
| | | 604/246 |
| 2009/0277535 A1* | 11/2009 | Wang ................... B67D 3/0032 |
| | | 222/164 |
| 2010/0005655 A1 | 1/2010 | Nguyen |
| 2010/0308963 A1* | 12/2010 | Kidd ........................ F17D 3/01 |
| | | 700/282 |
| 2011/0180172 A1 | 7/2011 | Gledhill, III et al. |
| 2013/0129536 A1* | 5/2013 | Robol .................... F04B 53/16 |
| | | 417/410.1 |
| 2015/0211509 A1 | 7/2015 | Gledhill, III et al. |
| 2018/0087942 A1 | 5/2018 | Gledhill, III et al. |
| 2018/0283297 A1* | 10/2018 | Schnorpfeil .......... F02D 41/025 |
| 2018/0291886 A1 | 10/2018 | Gledhill, III et al. |
| 2018/0298891 A1 | 10/2018 | Gledhill, III et al. |
| 2019/0017499 A1 | 1/2019 | Gledhill, III et al. |
| 2019/0234394 A1 | 8/2019 | Gledhill, III et al. |
| 2019/0316447 A1* | 10/2019 | Oehring .............. E21B 41/0085 |
| 2020/0003217 A1* | 1/2020 | Wilds ................. F04D 15/0016 |
| 2020/0149522 A1 | 5/2020 | Gledhill, III et al. |
| 2020/0386593 A1 | 12/2020 | Nguyen et al. |
| 2021/0047209 A1 | 2/2021 | Gledhill, III et al. |
| 2021/0054963 A1 | 2/2021 | Nguyen et al. |
| 2021/0324845 A1 | 10/2021 | Nguyen et al. |
| 2021/0348602 A1 | 11/2021 | Nguyen et al. |
| 2022/0099083 A1 | 3/2022 | Gledhill, III et al. |
| 2022/0276082 A1 | 9/2022 | Gledhill, III et al. |
| 2022/0316463 A1 | 10/2022 | Gledhill, III et al. |
| 2023/0015391 A1 | 1/2023 | Nguyen et al. |

* cited by examiner

LOCKOUT SYSTEM FOR METERING PUMP

INCORPORATION BY REFERENCE TO ANY PRIORITY APPLICATIONS

This application claims priority to U.S. Provisional Application No. 62/895,934, filed Sep. 4, 2019, and entitled "LOCKOUT SYSTEM FOR METERING PUMP," the disclosure of which is hereby incorporated by reference in its entirety.

BACKGROUND

Field

Certain embodiments discussed herein relate to methods, systems, and devices that protect against unauthorized adjustment of a metering pump.

Discussion of the Related Art

Metering pumps are widely used to inject chemicals such as sodium hypochlorite (NaOCl) and hydrochloric acid (HCl) into swimming pools to treat harmful organism as well as to control the pH level of the pool water for human comfort. To maintain a proper pH level, it can be useful to keep the metering pump operating at a set flow rate to deliver the correct amount of chemicals into the swimming pool. At the same time, it can be useful to have the metering pump configured to allow the adjustment of the flow rate depending on whether the set flow rate is overdosing or underdosing the swimming pool with chemicals.

SUMMARY

The systems, methods and devices described herein have innovative aspects, no single one of which is indispensable or solely responsible for their desirable attributes. Without limiting the scope of the present disclosure, some of the advantageous features will now be summarized.

According to some variants, a lockout system for a metering pump is provided herein. In some aspects, the lockout system can include a pump motor, a user interface comprising at least one user input station, and a control unit configured to receive an input signal from the at least one user input station. The control unit can be further configured to adjust an operational speed of the pump motor based on the input signal. The control unit can have a locked configuration and an unlocked configuration. In the locked configuration, the control unit can maintain the operational speed of the pump motor in response to receiving the input signal. In the unlocked configuration, the control unit can adjust the operational speed of the pump motor in response to receiving the input signal. The control unit can switch between the locked and unlocked configuration based on a lockout signal received from the user interface.

In some aspects, a method of restricting access to a control panel of a metering pump is provided. The method can include receiving a user input signal from a user interface and determining the user input signal is a lockout access code. The method can further include switching the metering pump between a locked configuration and an unlocked configuration based on a receipt of the lockout access code, wherein in the locked configuration an operational parameter of the metering pump is maintained in response to the user input signal, and wherein in the unlocked configuration, the operational parameter is adjusted in response to the user input signal.

Any of the features, components, or details of any of the arrangements or embodiments disclosed in this application, including without limitation any of the pump-mounting systems and any of the methods of mounting a device to the pump-mounting systems disclosed below, are interchangeably combinable with any other features, components, or details of any of the arrangements or embodiments disclosed herein to form new arrangements and embodiments.

BRIEF DESCRIPTION OF THE DRAWINGS

Aspects of the present disclosure are described with reference to the accompanying drawings, in which like reference characters reference like elements, and wherein.

DETAILED DESCRIPTION

Figure 1:
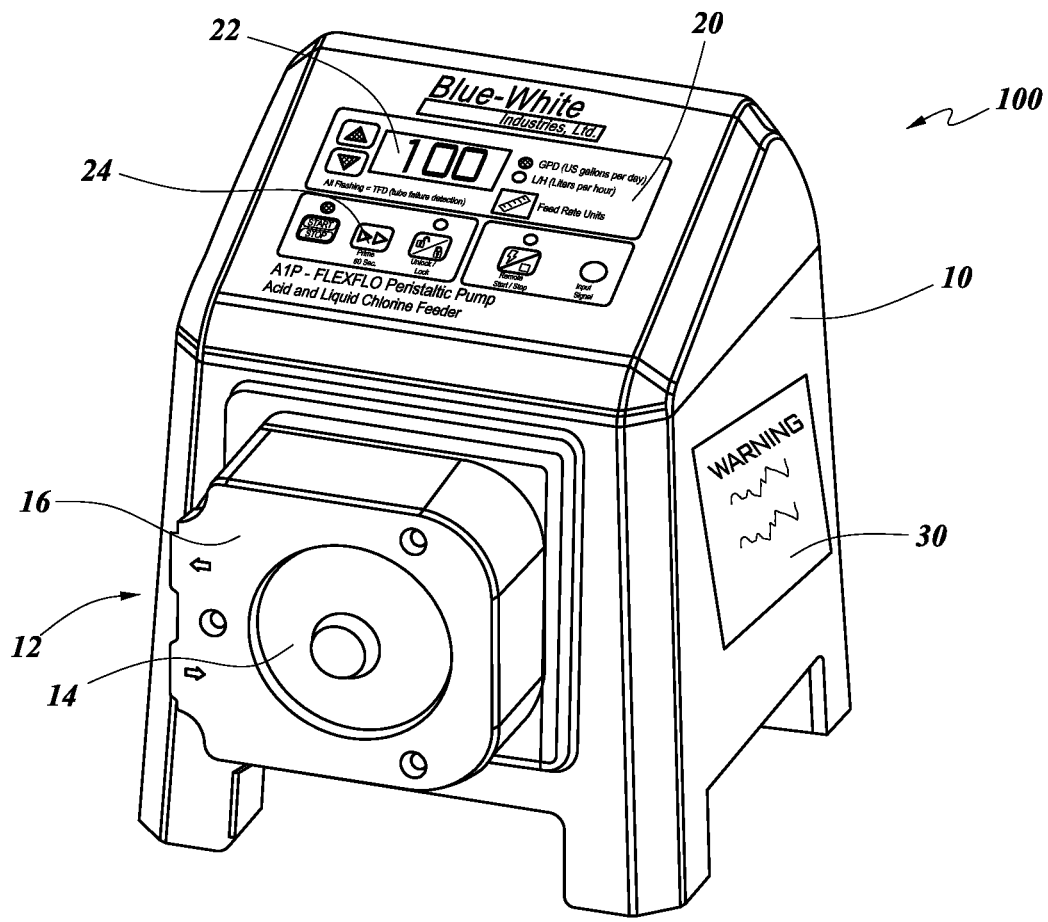
FIG. 1 is a front perspective view of a metering pump having a lockout system according to some aspects of the present disclosure.

While the present description sets forth specific details of various aspects of the present disclosure, it will be appreciated that the description is illustrative only and should not be construed in any way as limiting. Furthermore, various applications of such aspects and modifications thereto, which may occur to those who are skilled in the art, are also encompassed by the general concepts described herein.

For the sake of simplicity, the lockout systems of the present disclosure will be described in terms of a lockout system for a peristaltic metering pump. However, the lockout systems of the present disclosure can be used on other types of metering pumps (e.g., piston pumps) and on devices other than metering pumps. A pool operator can set the operational parameters of a metering pump such that the pump delivers the correct amount of chemical to the pool. The pump can maintain this correct rate of chemical injection provided there are no changes made to the pump speed afterward. The swimming pool can receive a proper amount of the chemical that is being metered by the pump. A problem with metering pumps is that metering pumps may be located in an area accessible to unauthorized personnel and, if the speed of the metering pump is altered by any unauthorized personnel, the pump speed can change, and the pump may no longer output the proper amount of chemical. The pool can be overdosed or underdosed with chemical, which can pose a health hazard to the people using the pool. The lockout systems of the present disclosure can be simple to operate and can provide an effective solution for avoiding the overdosing and underdosing of chemicals delivered to a pool by a metering pump. The lockout system requires no memorization and requires no components of a physical lock (e.g., padlock with key).

In some aspects, the lockout systems of the present disclosure can promote safety by preventing unauthorized personnel from altering the settings of a metering pump while allowing authorized personnel access to adjust the settings of the metering pump. The implementation of the locking and unlocking of the pump can be concealed from the public and known to the pool operators. As discussed herein, the pool operators can gain knowledge of the method for locking and unlocking the lockout system from a brochure or manual that is included with the packaging material of the pump. In some aspects, the lockout system can use a generic method of locking and unlocking different models of metering pumps such that pool operators can gain knowledge of the method for locking and unlocking a first metering pump based on the pool operator's knowledge of how to lock and unlock a second metering pump. In some aspects, the lockout systems of the present disclosure can promote safety by informing people who are seeking to adjust the metering pump that adjustment of the metering pump can pose health risks to the pool users and should be performed only by authorized personnel.

As discussed, the lockout systems and methods of the present disclosure can restrict access to the control features of a metering pump. The lockout system can allow a user to access the control features of a metering pump based on the user's familiarity with the lockout system. The lockout systems can reduce the likelihood of an unauthorized user gaining access to the control features of the metering pump. At the same time, the lockout systems can be generally accessible by a group of persons familiar with the lockout system such that a complex passcode is not required to gain access to the control features of the pump. The lockout system can promote safety because it facilitates the ability of authorized persons (e.g., ones familiar with the pump and lockout system) to make adjustments to metering pumps when overdosing or underdosing is detected while restricting access to the pump controls by unauthorized persons (e.g., ones unfamiliar with the lockout system). In some aspects, the lockout system can restrict accessibility to the metering pump controls for a first group of persons (e.g., persons unauthorized to adjust the operational settings of a metering pump) while maintaining accessibility to the pump controls for a second group of persons (e.g., persons unauthorized to adjust the operational settings of a metering pump). In some aspects, the lockout systems can include a notice that notifies a user who is attempting to gain access to the control features of the pump that such access should be limited to persons authorized to adjust the metering pump.

FIG. 1 illustrates a peristaltic metering pump 10 having a lockout system 100 according to some aspects of the present disclosure. The metering pump 10 can have a pump head 12 that includes a rotor 14 surrounded by a housing 16. The rotor 14 can compress a pump tubing (not shown) against the housing 16 in a peristaltic squeezing action as the rotor 14 rotates, thereby driving fluid through the pump tubing. The pump tubing dimensions and the rotational speed of the rotor 14 can determine the volumetric output of the peristaltic metering pump 10. An accurate amount of chemical can be delivered by the metering pump 10 by controlling the rotational speed of the rotor 14.

The pump 10 can include an electronic speed-control system to control the rotational speed of the rotor 14. Electronic speed-control systems can have the benefits of high accuracy and repeatability. The speed-control system can include a user interface 20. The user interface 20 can include a display 22 (e.g., LCD display, LED display). The display 22 can display an operational parameter of the pump 10, such as the number of revolutions per minute the rotor 14 is currently turning. The user interface 20 can include one or more input stations 24 (e.g., buttons, switches, dials). In some aspects, the one or more input stations 24 can be arranged as a membrane keypad. The speed-control system can include a microprocessor configured to receive a command signal from the one or more input stations 24 and transmit a control signal to an electric motor of the pump 10 based on the command signal received from the one or more input stations 24. In this way, the speed-control system can allow a user to adjust an operational parameter of the pump 10 through the user interface 20. The main circuit board of the pump 10 can receive signal inputs from the membrane keypad and drive the motor at a determined speed accordingly.

In some aspects, the lockout system 100 can include a passkey notice 30. The passkey notice 30 can provide instructions on how to lock or unlock the lockout system 100 to prevent or allow adjustment of the operational parameters of the pump 10 through the user interface 20. In some aspects, the passkey notice 30 can include a warning that informs the reader that adjustment of the operational parameters of the pump 10 is undesired or could cause harm to others by overdosing or underdosing the treated water (e.g., swimming pool) with chemicals. The passkey notice 30 can be arranged so that a warning against adjusting the operational parameters of the pump 10 precedes the instructions of how to unlock the lockout system 100. In this way, the passkey notice 30 of the lockout system 100 can deter unauthorized persons from adjusting the operational parameters of the pump. The passkey notice 30 can include information designed to impress upon the user the dangers of incorrectly adjusting the operation of the pump 10. For example, the passkey notice 30 can include: the name of the chemical that is being metered by the pump, potential health risks to pool users that could arise as a result of incorrect adjustment of the pump 10, and the potential legal liability that may attach to the user for unauthorized adjustment of the pump 10.

In some aspects, the passkey notice 30 can be displayed on the pump 10, such as on the housing of the pump 10, as shown in FIG. 1. The lockout system 100 can include an input station 24 that is labeled "unlock." The lockout system 100 can include a marking on the user interface 20 that refer the user to the location of the passkey notice 30. For example, the user interface 20 can include printing that reads "To unlock, see side panel of pump." In this way, the lockout system 100 can provide general accessibility to the control features of the pump 10 for a user that has read the passkey notice 30. In other aspects, the passkey notice 30 can be included in the directions for the pump 10, but maintained physically separate from the pump 10 (e.g., such as in an owner's manual), so that it is not viewable by individuals having access to the pump 10, but not the passkey notice 30 (e.g., in the owner's manual).

The lockout system 100 can promote safety by providing a warning against adjustment of the metering pump 10 while providing instruction on how to adjust the operation of the metering pump 10. In this way, the lockout system 100 can promote the adjustment of the pump by authorized persons while allowing unauthorized persons to adjust the pump after they have gained awareness of the dangers that can arise from incorrect adjustment of the pump 10. In some aspects, the passkey notice 30 can be displayed in a manual associated with the pump 10 and not displayed on the pump 10. In this way, the passkey notice 30 can be more easily accessible to persons who are authorized to adjust the pump 10 compared to persons who are unfamiliar with the lockout system 100 of the pump 10 or who are unauthorized to perform adjustment of the pump 10.

Figure 2:
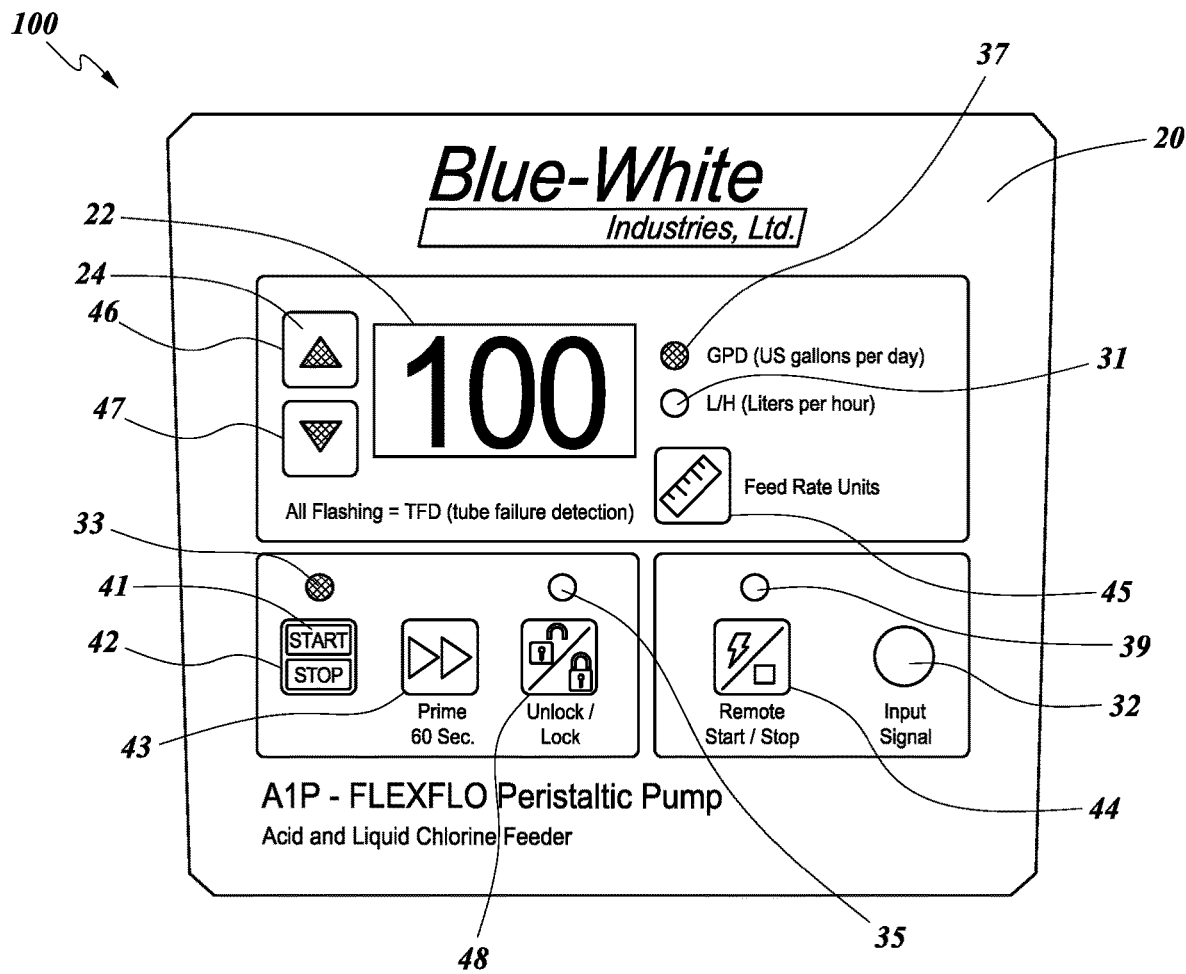
FIG. 2 illustrates an embodiment of a user interface of a lockout system according to some aspects of the present disclosure.

FIG. 2 illustrates a user interface 20 of the lockout system 100, according to some aspects of the present disclosure. The user interface 20 can have a membrane keypad that is integrated with the pump housing. As discussed, the user interface 20 can include a display 22 and one or more input stations 24. The input stations 24 can include buttons such as a start button 41, a stop button 42, a prime button 43, a signal button 44, a rate display button 45, an up button 46, a down button 47, and a lockout button 48. The start button 41 can be used to start the pump 10 (e.g., start rotating the rotor 14). The stop button 42 can be used to stop the pump 10 (e.g., stop rotating the rotor 14). The prime button 43 can be used to initiate priming of the pump 10 by operating the pump 10 at full speed for a timed duration (e.g., 60 seconds). The signal button 44 can be used to enable or disable the pump 10 to receive an input signal from a device (e.g., a flowmeter). The rate display button 45 can be used to cycle through the engineering unit of the flowrate or other pump parameter that is displayed on the display 22. The up button 46 can be used to increase an operational parameter of the pump 10, such as the rotational speed of the rotor 14. The down button 47 can be used to decrease an operational parameter of the pump 10, such as the rotational speed of the rotor 14. The lockout button 48 can be used to switch the pump 10 between a locked configuration and an unlocked configuration, as discussed herein. As discussed, the aforementioned illustrative input stations 24 can be a switch, a toggle, or a dial rather than a button. For example, in some aspects the rate display button 45 can be a toggle or a switch that is flipped between two options of units (e.g., gallons per day or liters per hour) or a dial that is rotated to choose a desired option from among a selection of two or more possible options.

The user interface 20 can include one or more indicator lights 31. The indictor lights 31 can include lights such as a run light 33, a lock light 35, a rate-unit light 37, and a signal light 39. In some aspects, the indicator light 31 can be a single-color LED that switches between an on configuration and an off configuration to indicate whether a certain feature is selected or de-selected. For example, the lock light 35 can illuminate to indicate the pump 10 is locked and the operation of the pump 10 cannot be adjusted. The lock light 35 can cease to illuminate to indicate the pump 10 is unlocked and operation of the pump 10 can be adjusted. In some aspects, the indicator light 31 can be a dual- or multi-color LED that switches between the two or more colors (e.g., red or green) to indicate whether a feature is selected or de-selected. For example, the run light 33 can illuminate green to indicate the pump 10 is running and illuminate red to indicate the pump 10 is stopped.

In some aspects, the user interface 20 can include a communication port 32. The communication port 32 can be configured to receive or transmit a signal to another instrument such as a remote computer that instructs or logs the performance of the pump 10. In some aspects, the communication port 32 can be a jack (e.g., 4-pin jack) or other such closure contact for establishing electrical connection. In some aspects, the signal light 39 can indicate the status of the communication port 32. For example, the signal light 39 can illuminate green to indicate a remote-start option is available for the pump 10 through the communication port 32. The signal light 39 can illuminate a different color (e.g., red), or not at all, to indicate a remote-start option is not available through the communication port 32. In some aspects, the indicator lights 31 can illuminate in specific patterns to indicate a problem or status of the pump 10. For example, the signal light 39 can blink green to indicate a signal is currently being received at the communication port 32.

In some aspects, the lockout system 100 can include one or more input stations 24 that are configured to serve one or more functions. In some aspects, rather than having a lockout button 48 (FIG. 2) that is labeled as such, the lockout system 100 can be locked or unlocked by pressing an input station 24 that is labeled for a function other than locking and unlocking the lockout system 100. For example, the lockout system 100 can be configured to lock or unlock the pump 10 based on the up button 46 being pressed continuously for a duration of time (e.g., 5 seconds). In some aspects, the lockout system 100 can be configured to lock or unlock the pump 10 based on two input stations 24 being pressed simultaneously and continuously for a duration of time (e.g., 5 seconds). In some variants, the lockout system 100 is configured to switch the pump 10 between the lock and unlocked configurations upon an input station 24 being actuated continuously by contact with a user (e.g., pressed) for a time of: 3 seconds, 4 seconds, 5 seconds, 6 seconds, 7 seconds, 8 seconds, 9 seconds, 10 seconds, a value between the aforementioned values, or otherwise. In some variants, the lockout system 100 is configured to switch between the locked and unlocked configurations upon two or more input stations 24 (e.g. the up button 46 and the down button 47) being actuated (e.g., pressed) simultaneously and continuously for a time of: 3 seconds, 4 seconds, 5 seconds, 6 seconds, 7 seconds, 8 seconds, 9 seconds, 10 seconds, a value between the aforementioned values, or otherwise.

As discussed, the lockout system 100 can be configured so that the flow rate of the metering pump 10 cannot be adjusted when the lockout system 100 is in the locked configuration. In some aspects, certain control features of the pump 10 can be adjusted even when the lockout system 100 is in the locked configuration. For example, in some variants the lockout system 100 can allow the pump 10 to be stopped by pressing an input station 24 (e.g., the stop button 42) whether the lockout system 100 is in the locked or unlocked configuration. Allow a user to stop the pump 10 in the locked configuration may promote safety by allowing the pump to be shut off quickly in an emergency situation. In some arrangements, the lockout system 100 can sound an alarm when the pump 10 is shut off while the lockout system 100 is in the locked configuration. In some aspects, the lockout system 100 can allow the prime function of the pump 10 to operate whether the lockout system 100 is in the locked or unlocked configuration. The prime feature may be needed to clear the metering tubing of vapor that can form within the metering tubing. For example, hot summer temperatures can cause chlorine vapor to form within the chlorine metering line of a pool. The prime feature can also be needed in the locked configuration to get rid of empty tubing if the stock of the metered fluid runs dry and needs to be replaced. In certain situations, it may be useful to allow a user to clear the line with the prime feature when the lockout system 100 is in the locked configuration. In some variants, an alarm may sound when the pump is primed when the lockout system 100 is in the locked configuration. In some aspects, the lockout system 100 can limit the number or frequency of times the prime feature can be used when the lockout system 100 is in the locked configuration. The lockout system 100 may allow unlimited use of the prime feature in the unlocked configuration. The lockout system 100 can allow customization of the control features that are available in the locked configuration. The lockout system 100 can be customized according to the industry for which the lockout system 100 is being used. In some aspects, the lockout system 100 can allow a user to program the control features that are locked or unlocked when the lockout system 100 is in the locked configuration.

The lockout system 100 can include a passkey notice 30 that provides information regarding the method of locking or unlocking the lockout system 100. The passkey notice 30 can describe the one or more input stations 24 that can be used to lock or unlock the pump 10. The passkey notice 30 can inform a user of the method of pressing the one or more input stations 24 to lock or unlock the pump. The procedure to unlock the pump 10 can be the same as the procedure to lock the pump 10. In some aspects, the procedure to unlock the pump 10 can be different from the procedure to lock the pump 10. For example, different combinations of input stations 24 can be pressed for locking the pump 10 compared to unlocking the pump 10, or the input stations 24 can be held for a different duration of time to lock the pump 10 compared to unlocking the pump 10.

In some aspects, the lockout system 100 can allow a user to set or program the unlocking parameters. In some aspects, the user can set the unlocking parameters when the user is locking the pump 10. For example, the user can lock the pump 10 by holding the up button 46 down for at least 5 seconds, at which time the display 22 can begin blinking and incrementing a timer on the display 22 until the user releases the up button 46. The time that the user held down the up button 46 can then be required to unlock the pump 10. In this way, a user that is locking the pump 10 can extend the unlocking duration to more than 5 seconds (e.g., 7 seconds). Similarly, the user can press a pattern of one or more input buttons 46 that must be repeated to unlock the pump 10. In this way, the lockout system 100 can allow customization or tighter restrictions to be applied for gaining access to adjust the operational parameters of the pump 10.

Figure 3B:
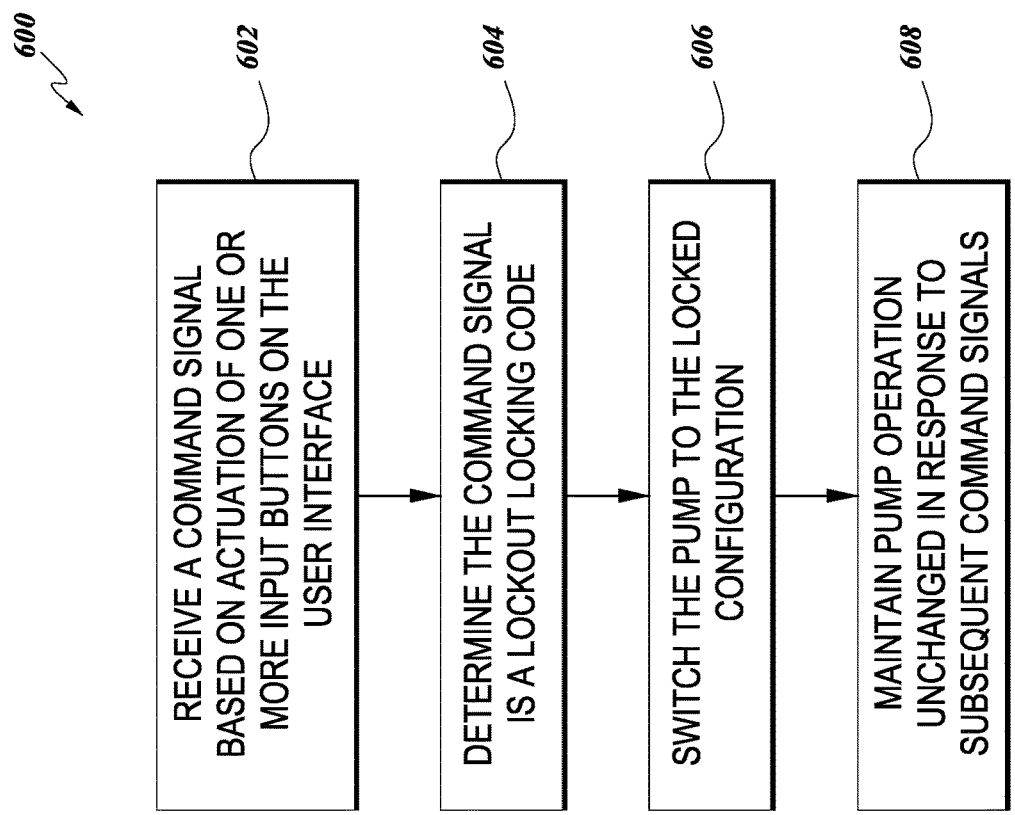
FIG. 3B illustrates a flow chart for a method of locking a lockout system according to some aspects of the present disclosure.
Figure 3A:
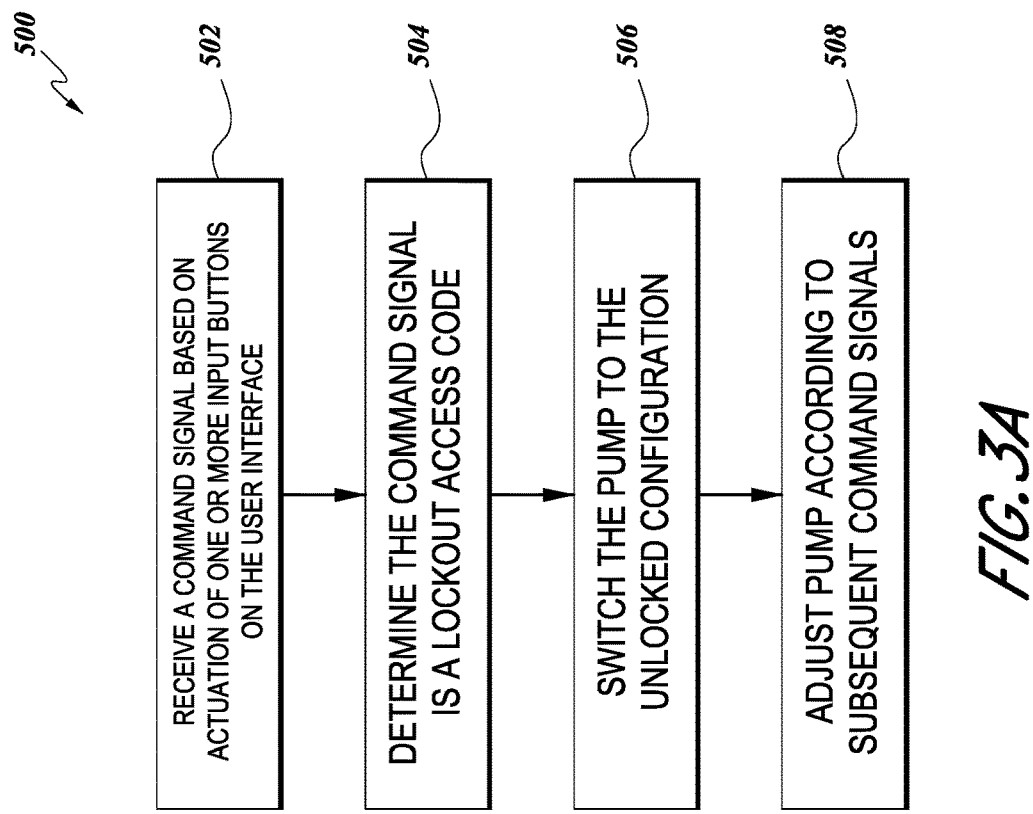
FIG. 3A illustrates a flow chart for a method of unlocking a lockout system according to some aspects of the present disclosure.

FIG. 3A shows a schematic diagram of a method 500 of operating the lockout system 100 to unlock a metering pump 10 so that the operational parameters of the metering pump 10 can be adjusted by the user interface 20. The method can include a first step 502 of receiving a command signal based on an actuation of one or more input stations 24 of the user interface 20. The method can include a second step 504 of determining that the received command signal is a lockout access code that authorizes the pump 10 to switch from the locked configuration to the unlocked configuration. The method can include a third step 506 of switching the pump 10 from the locked configuration to the unlocked configuration, wherein the operational pump parameters can be adjusted by the user interface 20 in the unlocked configuration. The method can include a fourth step 508 of adjusting the operational parameters of the pump 10 according to subsequent command signals received from the user interface 20.

FIG. 3B shows a schematic diagram of a method 600 of operating the lockout system 100 to lock a metering pump 10 so that the operational parameters of the metering pump 10 cannot be adjusted by the user interface 20. The method can include a first step 602 of receiving a command signal based on an actuation of one or more input stations 24 of the user interface 20. The method can include a second step 604 of determining that the received command signal is a lockout locking code that authorizes the pump 10 to switch from the unlocked configuration to the locked configuration. The method can include a third step 606 of switching the pump 10 from the unlocked configuration to the locked configuration, wherein the operational pump parameters cannot be adjusted by the user interface 20 in the locked configuration. The method can include a fourth step 608 of maintaining unchanged the operational parameters of the pump 10 in response to receiving subsequent command signals received from the user interface 20.

While the preferred embodiments of the present inventions have been described above, it should be understood that they have been presented by way of example only, and not of limitation. It will be apparent to persons skilled in the relevant art that various changes in form and detail can be made therein without departing from the spirit and scope of the inventions. Thus the present inventions should not be limited by the above-described exemplary embodiments, but should be defined only in accordance with the following claims and their equivalents. Furthermore, while certain advantages of the inventions have been described herein, it is to be understood that not necessarily all such advantages may be achieved in accordance with any particular embodiment of the inventions. Thus, for example, those skilled in the art will recognize that the inventions may be embodied or carried out in a manner that achieves or optimizes one advantage or group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A metering pump comprising:
    a pump motor;
    a user interface comprising at least one user input station; and
    a control unit configured to receive an input signal from the at least one user input station, the control unit further configured to adjust an operational speed of the pump motor based on the input signal, wherein the control unit has a locked configuration and an unlocked configuration, wherein in the locked configuration the control unit maintains the operational speed of the pump motor in response to receiving the input signal, wherein in the unlocked configuration, the control unit adjusts the operational speed of the pump motor in response to receiving the input signal, wherein the control unit switches between the locked and unlocked configuration based on a lockout signal received from the user interface, wherein the control unit is configurable in at least one of the following ways (1) to sound an alarm when the pump motor is shut off while the control unit is in the locked configuration and (2) to perform a prime function whether the control unit is in the locked or unlocked configuration.

2. The metering pump of claim 1 further comprising a passkey notice that provides an instruction on how to generate the lockout signal with the user interface.

3. The metering pump of claim 2, wherein the passkey notice is displayed on the metering pump.

4. The metering pump of claim 2, wherein the passkey notice includes a warning against adjusting an operational parameter of the metering pump.

5. The metering pump of claim 2, wherein the passkey notice is displayed within an operational manual of the metering pump.

6. A method of restricting access to a control panel of a metering pump, the method comprising:
    receiving a user input signal from a user interface;
    determining the user input signal is a lockout access code; and
    switching the metering pump between a locked configuration and an unlocked configuration based on a receipt of the lockout access code, wherein in the locked configuration an operational parameter of the metering pump is maintained in response to the user input signal, and wherein in the unlocked configuration, the operational parameter is adjusted in response to the user input signal, and at least one of the following (1) sounding an alarm when the pump is shut off while in the locked configuration and (2) performing a prime function when in the locked or unlocked configuration.

7. The method of claim 6, further comprising displaying a passkey notice that provides an instruction on how to generate the lockout access code with the user interface.

8. The method of claim 7, wherein displaying comprises displaying the passkey notice on the metering pump.

9. The method of claim 7, wherein displaying comprises displaying the passkey notice within or on a packaging of the metering pump.

10. The method of claim 7, wherein determining the user input signal is a lockout access code comprises determining whether a user input is actuated continuously by contact with a user for a specified duration of time.

11. The method of claim 10, wherein the specified duration of time is at least 4 seconds.

12. The method of claim 11, wherein the specified duration of time is between 4 seconds and 10 seconds.

13. The method of claim 7, wherein determining the user input signal is a lockout access code comprises determining two or more input stations of the user interface are actuated simultaneously and continuously for a specified duration of time.

14. The method of claim 13, wherein the specified duration of time is between 4 seconds and 10 seconds.

15. The metering pump of claim 1, wherein the control unit is configurable both (1) to sound an alarm when the pump motor is shut off while the control unit is in the locked configuration and (2) to perform a prime function whether the control unit is in the locked or unlocked configuration.

16. The method of claim 6, comprising both (1) sounding an alarm when the pump is shut off while in the locked configuration and (2) performing a prime function when in the locked or unlocked configuration.

* * * * *